United States Patent [19]

Alligood et al.

[11] Patent Number: 4,893,139

[45] Date of Patent: Jan. 9, 1990

[54] COMPACT CAMERA PROVIDING DIRECT AND INDIRECT FLASH

[75] Inventors: John H. Alligood, Penfield; Joel S. Lawther, Rochester, both of N.Y.

[73] Assignee: Eastman Kodak Company, Rochester, N.Y.

[21] Appl. No.: 309,454

[22] Filed: Feb. 10, 1989

[51] Int. Cl.[4] .............................................. G03B 15/05
[52] U.S. Cl. ................................. 354/149.1; 354/126; 354/149.11
[58] Field of Search ................... 354/126, 145.1, 149.1, 354/149.11, 293; 362/3

[56] References Cited

U.S. PATENT DOCUMENTS 2,748,259  5/1956  Friedman .............................. 362/16
3,855,602  12/1974  Hoos ..................................... 354/293
4,078,240  3/1978  Kaneko et al. ........................ 354/126
4,331,405  5/1982  Yamamoto ............................ 354/126

*Primary Examiner*—A. A. Matthews
*Attorney, Agent, or Firm*—Roger A. Fields

[57] ABSTRACT

A compact camera is of the type wherein a built-in flash unit is movable between a storage or folded position and an erect position. According to the invention, the flash unit includes a flash light emission window that is arranged to face generally toward a subject to be photographed when the flash unit is in its erect position, to provide direct illumination of the subject, and to face substantially upward with respect to the subject when the flash unit is in its storage position, to provide indirect bounce illumination of the subject.

3 Claims, 2 Drawing Sheets

4,893,139

COMPACT CAMERA PROVIDING DIRECT AND INDIRECT FLASH

CROSS-REFERENCE TO A RELATED APPLICATION

Reference is made to commonly assigned copending U.S. application Ser. No. 07/309,455 entitled COMPACT CAMERA WITH FLASH UNIT MOVABLE TO REDUCE RED-EYE, and filed Feb. 10, 1989, in the names of John H. Alligood and Joel S. Lawther

BACKGROUND OF THE INVENTION

1. Field of the Invention

The invention relates generally to photography, and particularly to a compact camera with a built-in movable flash unit.

2. Description of the Prior Art

When taking a flash exposure indoors, it is known that in order to obtain an agreeably diffused result the flash unit is aimed away from the subject to be photographed and at the walls and/or the ceiling to thereby cause the flash light to bounce toward the subject. Hence, the term "bounce flash" applies to this technique.

Compact cameras having a built-in flash unit that is movable between a storage or folded position and an operative erect position are quite popular today. These cameras, however, generally are not designed to provide a bounce flash. For example, in U.S. Pat. No. 4,331,405, granted May 25, 1982, the flash unit of a compact camera is arranged with its flash light emission window in contact with an upper surface of the camera body when the flash unit is in its storage position. Alternatively, the flash unit is constrained to aim the flash light emission window at the subject when the flash unit is in its erect position. Thus, bounce illumination of the subject is not possible.

The Cross-Referenced Application

The application cross-referenced above discloses a compact camera wherein a built-in flash unit is movable between a storage or folded position in which the flash unit is located relatively close to the camera objective lens and an erect position in which the distance between the flash unit and the objective lens is increased to reduce the possibility of red-eye when using the flash unit to take a picture. The flash unit is supported for movement from its storage position to its erect position generally along an arc extending diagonally of an upper surface of the camera body. The upper surface is longitudinally disposed between opposite ends of the camera body. Owing to this arrangement, the distance between the flash unit and the objective lens can be made greater when the flash unit is in its erect position.

SUMMARY OF THE INVENTION

As compared to the prior art described above, the invention advantageously is directed to a compact camera having a movable flash unit that is capable of providing direct and indirect illumination of the subject to be photographed.

According to the invention, there has been devised an improved photographic camera wherein a flash unit is movable relative to the camera body between an erect position and a storage position, and wherein the improvement comprises: said flash unit including a flash light emission window arranged to face generally toward a subject to be photographed when the flash unit is in its erect position, to provide direct illumination of the subject, and arranged to face substantially upward with respect to the subject when the flash unit is in its storage position, to provide indirect bounce illumination of the subject.

DETAILED DESCRIPTION OF THE PREFERRED EMBODIMENT

The invention is described as being embodied in a compact 35 mm camera having a movable electronic flash unit. Because such photographic cameras and flash units are generally well known, this description is directed in particular to camera and flash elements forming part of or cooperating directly with the preferred embodiment. It is to be understood, however, that camera and flash elements not specifically shown or described may take various forms known to persons of ordinary skill in the art.

Figure 1:
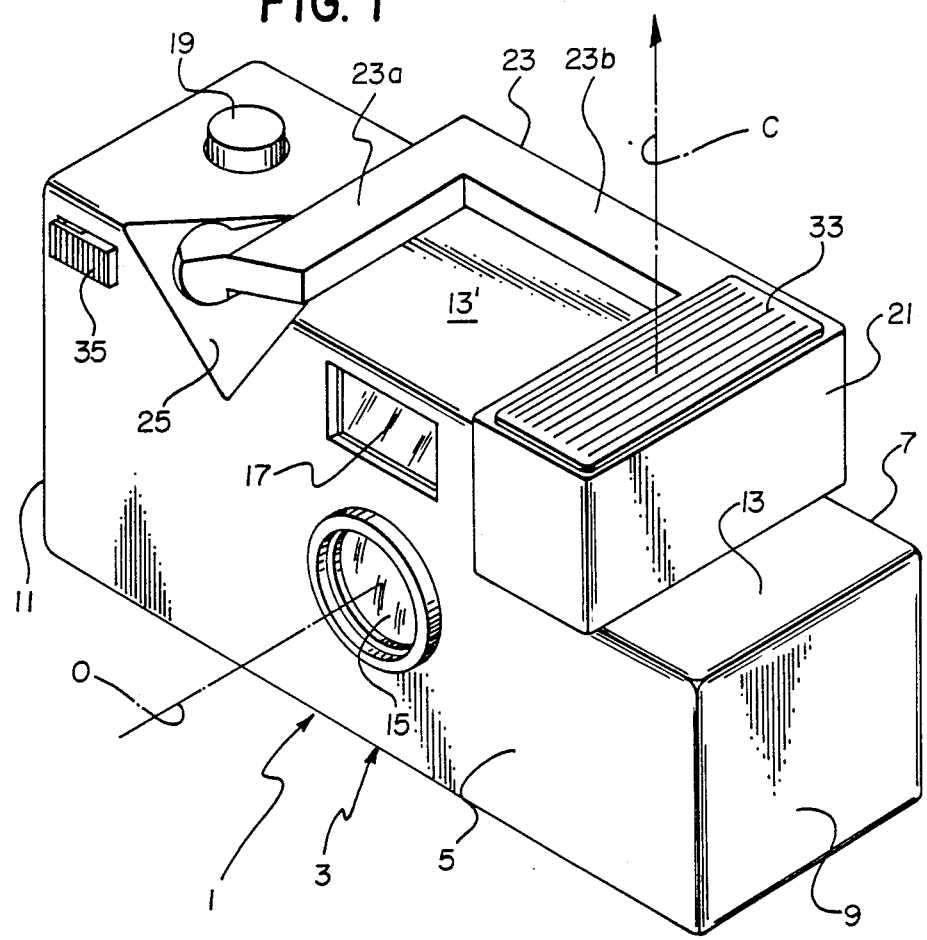
FIG. 1 is a front perspective view of a compact camera with a built-in movable flash unit according to a preferred embodiment of the invention, showing the flash unit in a storage or folded position.
Figure 2:
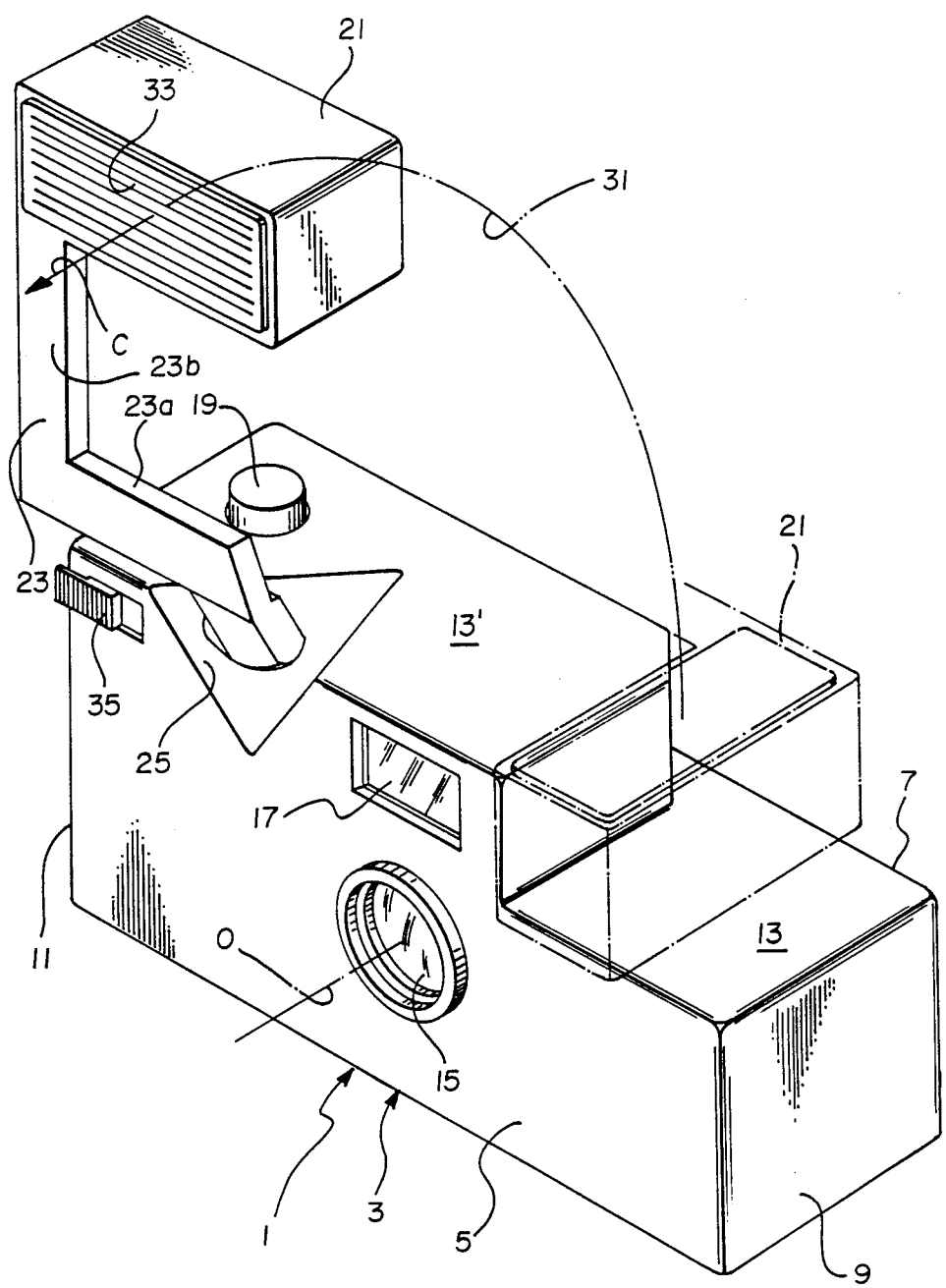
FIG. 2 is a front perspective view of the compact camera, showing the flash unit moved to an erect position from its storage position.

Referring now to the drawings, FIGS. 1 and 2 depict a compact 35 mm camera 1 having a camera body 3. The camera body 3 has front and rear faces 5 and 7, opposite ends 9 and 11, and a two-liter upper surface 13, 13'. A conventional objective lens 15 and a viewfinder window 17 are located inwardly of the front face 5 of the camera body 3 and a depressible shutter release button 19 is located at the upper surface 13' of the camera body.

Figure 3:
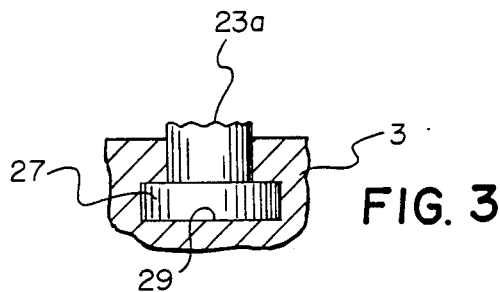
FIG. 3 is a sectional view of a pivotable coupling between the flash unit and the camera body.

An electronic flash unit 21 is movable with respect to the camera body 3 between a storage or folded position, shown in FIG. 1, and an erect position, shown in FIG. 2. In its storage position, the flash unit 21 longitudinally extends widthwise of the camera body 3 and is situated atop the upper surface 13 of the camera body. In its erect position, the flash unit 21 is elevated substantially above the upper surface 13' of the camera body 3 and longitudinally extends lengthwise of that surface. An extension arm 23 for elevating the flash unit 21 above the upper surface 13' comprises a first longitudinal section 23a pivotally connected to the camera body 3 at a front-top recess 25 in the camera body and a second longitudinal section 23b joining the first longitudinal section and the flash unit. The pivotal connection between the first longitudinal section 23a and the camera body 3 is effected by locating an annular end flange 27 of that longitudinal section within a mating cavity 29 in the camera body as shown in FIG. 3. Due to the location of the pivotal connection between the first longitudinal section 23a and the camera body 3 at the front-top recess 25 and a right angle relation between the first longitudinal section and the second longitudinal section 23b, the flash unit 21 is supported for movement between its storage and erect positions generally along an arc 31 which extends diagonally of the upper surfaces 13, 13' as shown in FIG. 2. Thus, the distance between the flash unit 21 and the objective lens 15 can be made greater (as compared to prior art devices, such as disclosed in U.S. Pat. No. 4,331,405) when the flash unit is in its erect position.

When the flash unit 21 is in its erect position as shown in FIG. 2, a flash light emission window 33 of the flash unit is arranged to face generally toward a subject to be photographed, i.e. in the same direction as the objective lens 15, to provide direct illumination of the subject. In other words, the center-line C of a flash beam emitted from the window 33 will be disposed parallel to the optical axis 0 of the objective lens 15. When the flash unit 21 is in its storage position as shown in FIG. 1, the window 33 is arranged to face substantially upward with respect to the subject, i.e. in an upward direction with respect to the objective lens 15, to provide indirect bounce illumination of the subject. In other words, the center-line C of a flash beam emitted from the window 33 will be disposed upright of the optical axis 0 of the objective lens 15.

A flash on/off operating member 35 is located on the front face 5 of the camera body 3. The operating member 35 is mounted for movement from its normal "off" position, shown in FIG. 1, in which it maintains a conventional flash charging circuit (not shown) de-energized, to an "on" position, shown in FIG. 2, in which it operates to close a switch (not shown) to effect energization of the charging circuit. In its "on" position, the operating member 35 extends beyond the one side 11 of the camera body 3 to serve as a reminder to return the operating member to its "off" position.

The invention has been described with reference to a preferred embodiment. However, it will be understood that various modifications can be effected within the ordinary skill in the art without departing from the scope of the invention.

We claim:
1. An improved photographic camera wherein a flash unit is movable relative to the camera body between an erect position unfolded from said camera body and a storage position folded against the camera body, and wherein the improvement comprises:

said flash unit including a flash light emission window arranged to face generally toward a subject to be photographed when the flash unit is in its erect position, to provide direct illumination of the subject, and arranged to face substantially upward with respect to the subject when the flash unit is in its storage position, to provide direct bounce illumination of the subject.

2. The improvement as recited in claim 1, wherein said camera body has an upper surface, and said flash unit is folded against said upper surface with said flash light emission window facing upward when the flash unit is in its storage position.

3. An improved photographic camera wherein a flash unit is mounted on the camera body for movement between a storage position in which said flash unit is located relatively close to the camera objective lens and an erect position in which the distance between the flash unit and said objective lens is increased, and wherein the improvement comprises:

said flash unit including a flash light emission window arranged to face generally in the same direction as said objective lens when the flash unit is in its erect position, to provide direct illumination of a subject to be photographed, and arranged to face in a substantially upward direction with respect to the objective lens when the flash unit is in its storage position, to provide indirect bounce illumination of the subject.

* * * * *

UNITED STATES PATENT AND TRADEMARK OFFICE
CERTIFICATE OF CORRECTION

PATENT NO. : 4,893,139
DATED : January 9, 1990
INVENTOR(S) : J. H. Alligood, J. S. Lawther It is certified that error appears in the above-identified patent and that said Letters Patent is hereby corrected as shown below:

Column 4, line 13, "direct" should read --indirect--.

Signed and Sealed this

Twenty-second Day of January, 1991

*Attest:*

HARRY F. MANBECK, JR.

*Attesting Officer*   *Commissioner of Patents and Trademarks*